United States Patent
Jeon

(10) Patent No.: US 7,379,761 B2
(45) Date of Patent: May 27, 2008

(54) POWER CONNECTION STRUCTURE OF MOBILE TERMINAL

(75) Inventor: Hyung-Woo Jeon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/143,909

(22) Filed: Jun. 1, 2005

(65) Prior Publication Data

US 2005/0272480 A1 Dec. 8, 2005

(30) Foreign Application Priority Data

Jun. 2, 2004 (KR) ........................ 10-2004-0040116

(51) Int. Cl.
*H04M 1/00* (2006.01)

(52) U.S. Cl. ............... 455/572; 455/343.1; 455/550.1; 455/573

(58) Field of Classification Search ........ 455/572–573, 455/575.1, 550.1, 128, 90.1, 343.1, 347; 379/433.08
See application file for complete search history.

(56) References Cited

U.S. PATENT DOCUMENTS 6,515,450 B1 * 2/2003 Kaiho et al. ................ 320/112

6,829,495 B2 * 12/2004 Lee .......................... 455/575.1
2001/0007823 A1    7/2001 Lee
2004/0176146 A1 *  9/2004 Kim ............................ 455/572
2005/0022924 A1 *  2/2005 Blackburn ................... 156/230

FOREIGN PATENT DOCUMENTS

CN          1365523         8/2002

* cited by examiner

*Primary Examiner*—CongVan Tran
(74) *Attorney, Agent, or Firm*—Lee, Hong, Degerman, Kang & Schmadeka

(57) ABSTRACT

A power connection structure of a mobile terminal, includes: a battery detachably mounted to a battery mounting portion of a mobile terminal body, wherein terminal groups, each including a plurality of terminals, are disposed at a predetermined interval; a plurality of terminal assemblies including a plurality of terminals and mounted corresponding to the predetermined interval so as to respectively contact with the terminal groups of the battery; and a receptacle positioned between the terminal assemblies. Accordingly, a region where constituent elements for power supply are installed is minimized, and a size of the mobile terminal may be reduced.

11 Claims, 6 Drawing Sheets

POWER CONNECTION STRUCTURE OF MOBILE TERMINAL

CROSS-REFERENCE TO RELATED APPLICATIONS

Pursuant to 35 U.S.C. § 119(a), this application claims the benefit of earlier filing date and right of priority to Korean Application No. 10-2004-0040116, filed on Jun. 2, 2004, the contents of which are hereby incorporated by reference herein in its entirety.

BACKGROUND OF THE INVENTION

1. Field of the Invention

The present invention relates to a mobile terminal, and particularly, to a power connection structure of a mobile terminal capable of reducing a size of the mobile terminal by minimizing a region where constituent elements for power supply are installed.

2. Description of the Background Art

A mobile terminal is a communication device which permits the voice transmission and reception with an other party anywhere while a user portably carries it along. With the development of information and communication technologies, such a mobile terminal has functions of message transmission/reception to/from an other party, Internet access and TV reception. Besides, the mobile terminal is provided with a camera to capture a still image or a moving image, and sends/receives the captured images to/from the other party. Such a mobile terminal is being increasingly widely used.

According to an exterior structure, the mobile terminal may be categorized into a bar type mobile terminal, a flip type mobile terminal, a folder type mobile terminal and a slider type mobile terminal.

FIG. 1 is a perspective view which illustrates one example of a mobile terminal, FIG. 2 is a plan view which illustrates a power connect structure of the conventional mobile terminal, FIG. 3 is a side view which illustrates the power connection structure of the conventional mobile terminal, and FIG. 4 is a perspective view which illustrates a battery constituting the mobile terminal.

As shown, the mobile terminal includes a terminal body 100 and a battery 200 detachably mounted to the terminal body 100 and supplying power to the terminal body 100.

Constituent elements including a main body 100 are provided in the terminal body 100, and a battery mounting portion 120 to which the battery 200 is mounted is provided at one side of the terminal body 100. Also, a battery locking unit (R) for fixing/releasing the battery to/from the terminal body 100 is provided at one side of the battery mounting portion 120.

The battery mounting portion 120 is formed as a recess having a size and a depth respectively corresponding to a size and a thickness of the battery 200. Also, the battery mounting portion 120 is formed in a slot type such that the battery can be slidingly inserted therein.

The battery 200 includes a cell 210 filled with electrolyte, safety circuits (not shown) for maintaining a constant and stable current when electric charge and discharge occurs inside the cell 210, a protection resin 220 for protecting the safety circuits, and terminals 230 connected to the protection circuit to supply power and transmit information to other elements. An exterior of the battery 200 commonly has a quadrangular shape with a predetermined thickness.

The battery 200 is mounted to the battery mounting portion 120 of the terminal body 100 and fixed to or released from the terminal body 100 by the locking unit (R).

The battery 200 is a secondary battery and is recharged by, for example, a charger after being used for a certain time.

A terminal assembly 130 connected to the battery terminal 230 is mounted to the terminal body 100, and the terminal assembly 130 is placed beside the battery 200. The terminal assembly 130 includes a case 131 formed as a predetermined shape and terminals 132 connected to the terminals of the battery. The terminals 132 of the terminal assembly correspond to the terminals 230 of the battery, and arranged at a regular interval.

Also, the terminal assembly 130 is connected to a main board 110 constituting the terminal body 100. The terminal assembly 130 contacts with the terminals 230 of the battery perpendicularly or horizontally.

When the battery 200 is mounted to the battery mounting portion 120 of the terminal body 100, the terminals 230 of the battery 200 are connected to the terminals 132 of the terminal assembly mounted to the terminal body 100.

The battery has four terminals 230, and the terminals 230 of the battery are arranged at one side of the battery 200 at regular intervals. The terminal assembly also has four terminals 132 corresponding to the terminals 230 of the battery, and the terminals 132 of the terminal assembly are arranged at the case 131 at regular intervals.

The battery and the terminal assembly may have three terminals 230 and three terminals 132, respectively.

The terminal body 100 is provided with a receptacle 140 used to transmit data and recharge the battery, and the receptacle 140 is placed beside the terminal assembly 130 and mounted to one end of the terminal body 100 to thereby easily connected to an external device.

The battery 200, the terminal assembly 130 and the receptacle 140 are arranged in a row along a direction of a long side of the terminal body 100.

Undescribed reference numeral 300 is a battery cover.

When the mobile terminal is used, power generated at the battery 200 is supplied to a main board 110 and other elements of the terminal body 100 through the terminals 230 of the battery and the terminals 132 of the terminal assembly. If the battery 200 is discharged, the battery 200 is detached from the terminal body 100 and recharged by a separate charger (not shown), or is recharged by a receptacle 140 without being detached from therefrom.

The battery may be recharged or information stored in the terminal body 100 is transmitted to an external device through the receptacle 140. Here, a special connector (not shown) is used.

Because a user always carries such a mobile terminal for use, it is very important to minimize the size of the mobile terminal for the purpose of the convenience of the user. Particularly, in the present circumstance that the size of the mobile terminal is increasing due to the improvement in performance and diversification of function of the mobile terminal, reducing its size while improving the performance and diversifying the function may improve convenience of the user and strengthen the competitiveness.

However, in the power connection structure of the aforedescribed mobile terminal, because the battery 200, the terminal assembly 130 and the receptacle 140 are arranged in a row in a longitudinal direction of the terminal body 100, a length of the terminal body 100 is lengthened, which increases the size of the mobile terminal.

If the terminal assembly and the receptacle 140 are respectively disposed at both sides of the battery 200, a distance between the terminal assembly 130 and the receptacle 140 becomes long, which causes problems in connecting to the main board 110.

SUMMARY OF THE INVENTION

Therefore, an object of the present invention is to provide a power connection structure of a mobile terminal capable of reducing a size of a mobile terminal by minimizing a region where constituent elements for power supply are installed.

To achieve these and other advantages and in accordance with the purpose of the present invention, as embodied and broadly described herein, there is provided a power connection structure of a mobile terminal, comprising: a battery detachably mounted to a battery mounting portion of a mobile terminal body, wherein terminal groups, each including a plurality of terminals, are disposed at a predetermined interval; a plurality of terminal assemblies including a plurality of terminals and mounted corresponding to the predetermined interval so as to respectively contact with the terminal groups of the battery; and an interface positioned between the terminal assemblies.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
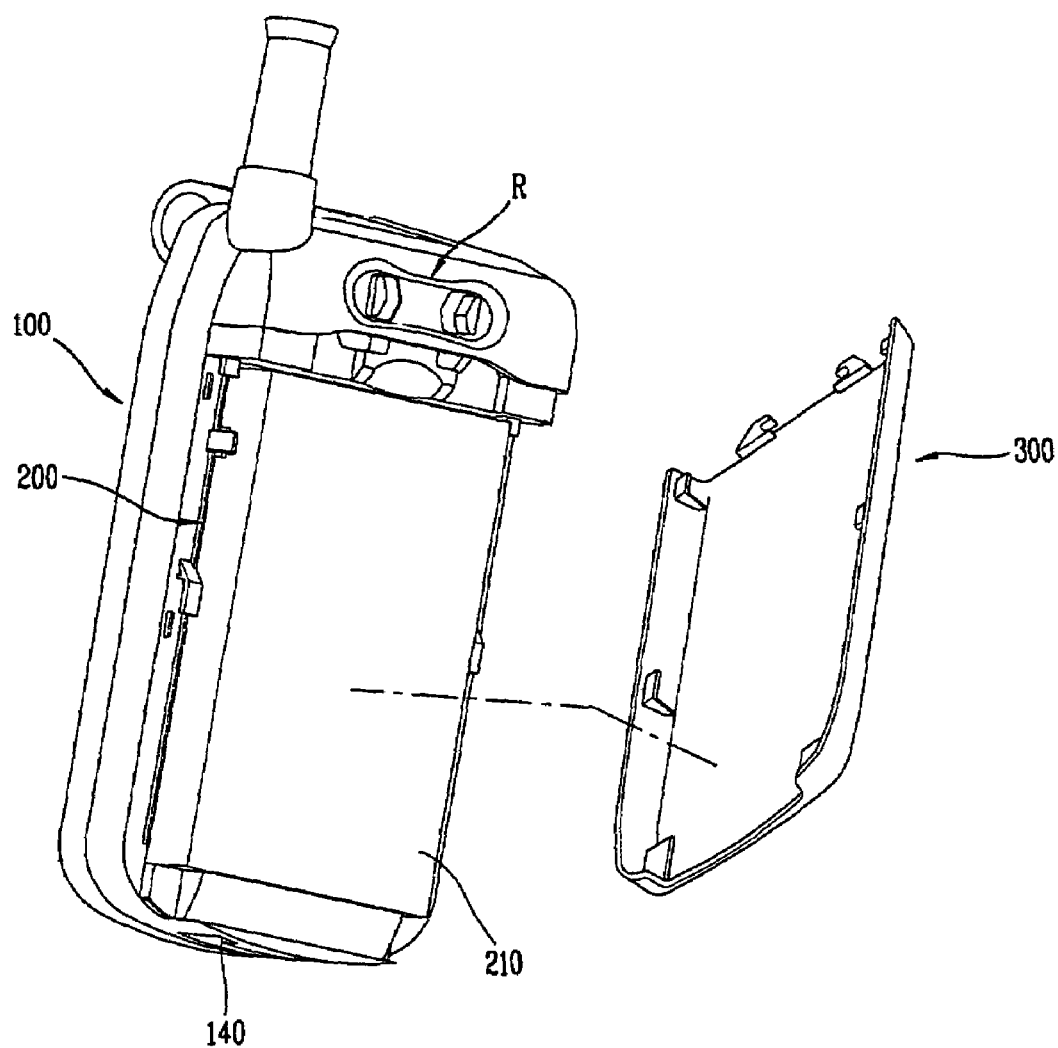
FIG. 1 is an exploded perspective view which illustrates one example of the mobile terminal.
Figure 2:
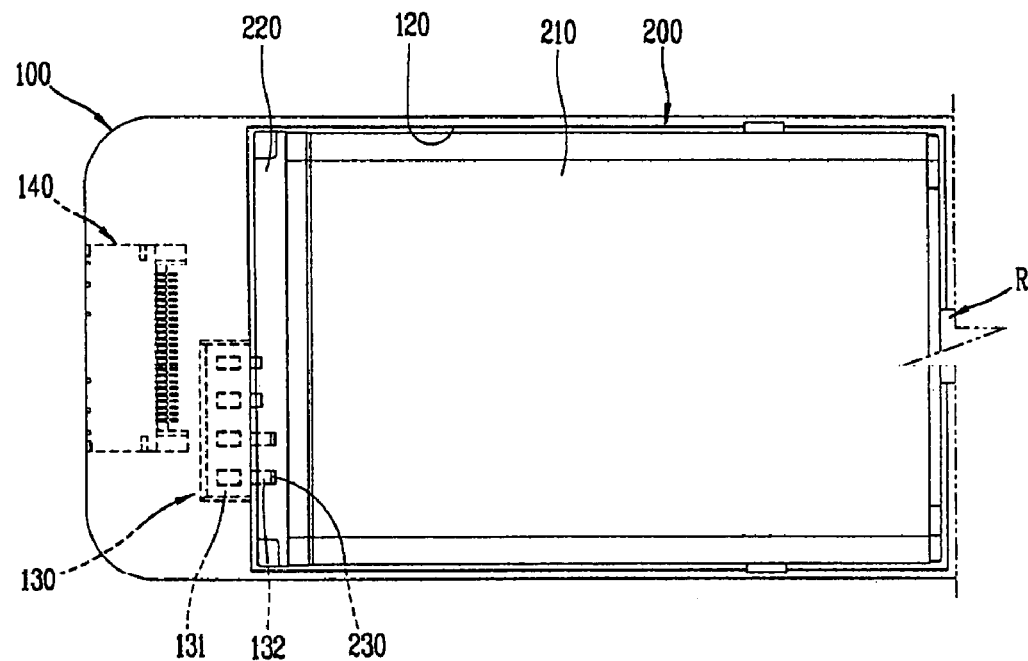
FIGS. 2 and 3 are a plan view and a front view which illustrate a power connection structure of the conventional mobile terminal.
Figure 3:
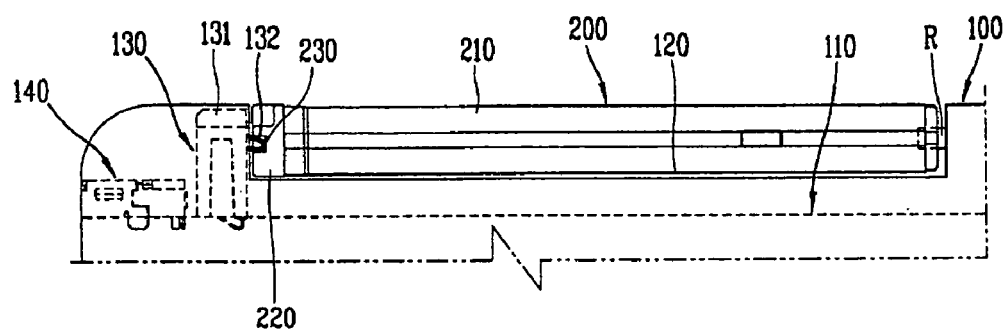
Figure 4:
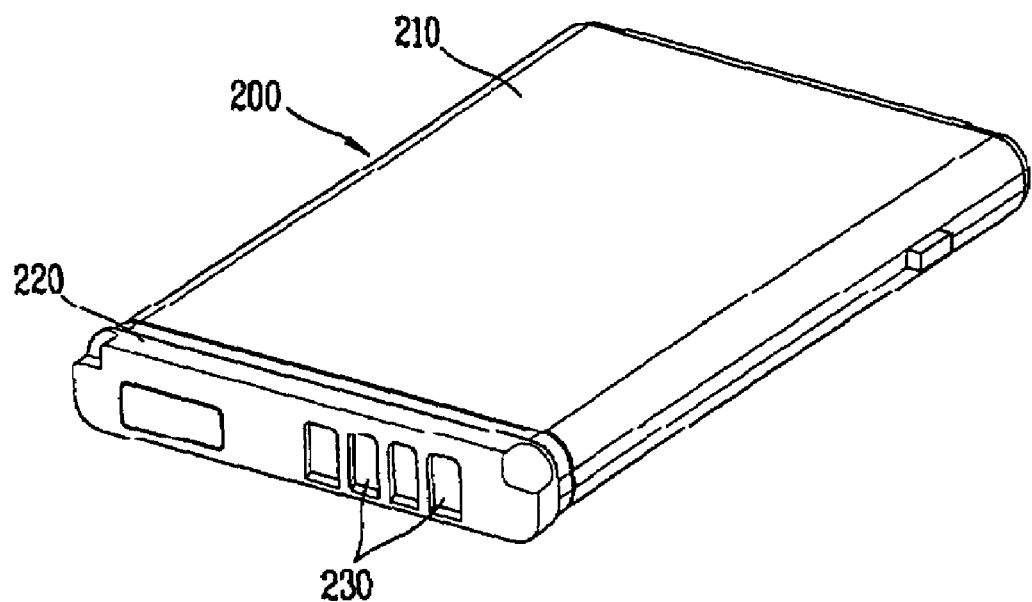
FIG. 4 is a perspective view which illustrates a battery constituting the mobile terminal.
Figure 5:
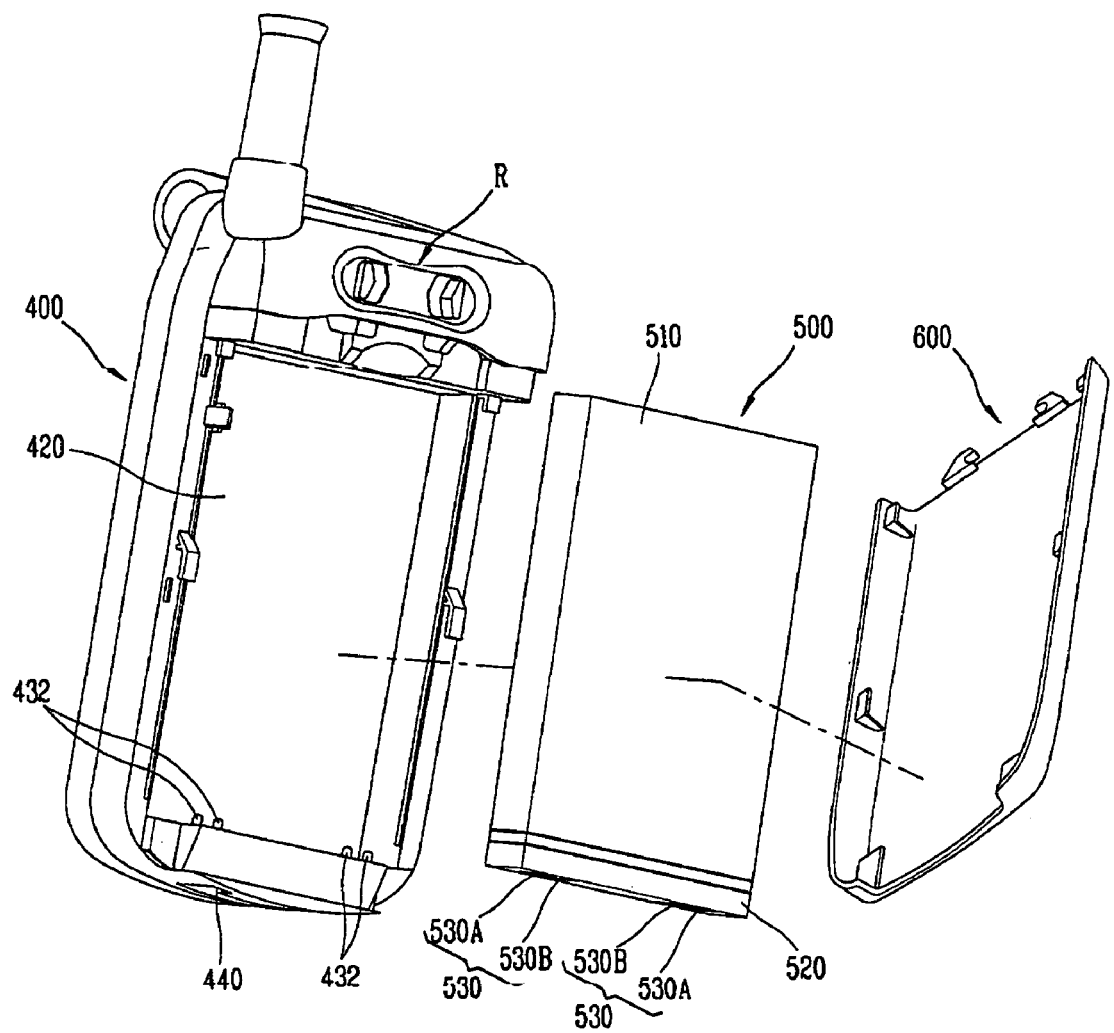
FIG. 5 is an exploded perspective view which illustrates a mobile terminal employing a power connection structure in accordance with one embodiment of the present invention.
Figure 6:
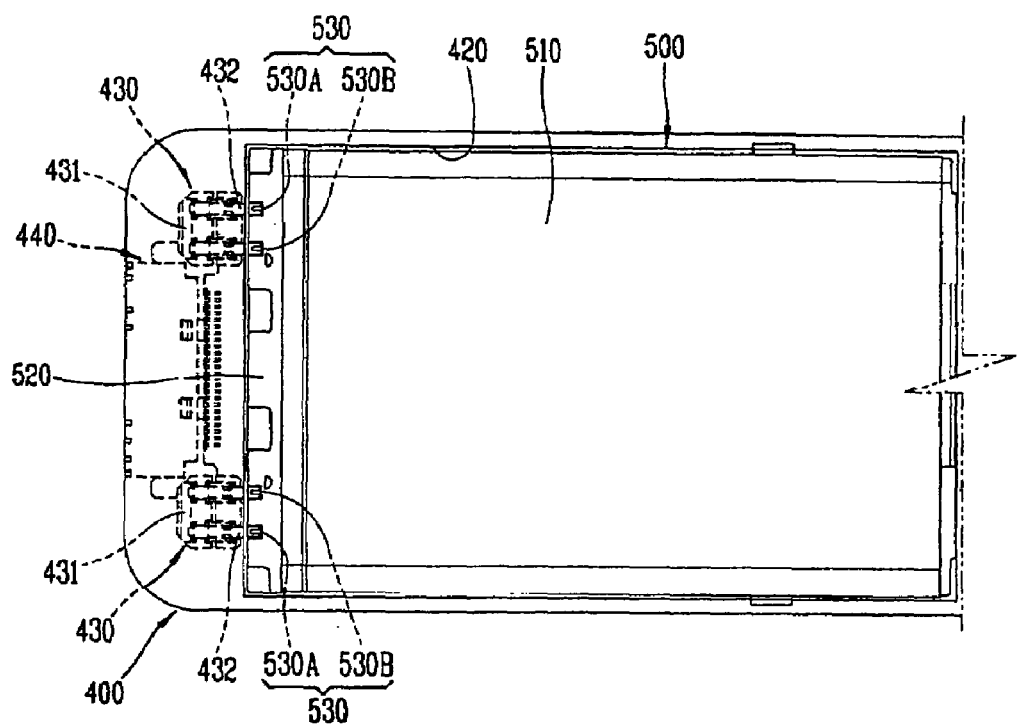
FIGS. 6 and 7 are a plan view and a front view which illustrate a power connection structure of the mobile terminal in accordance with one embodiment of the present invention.
Figure 7:
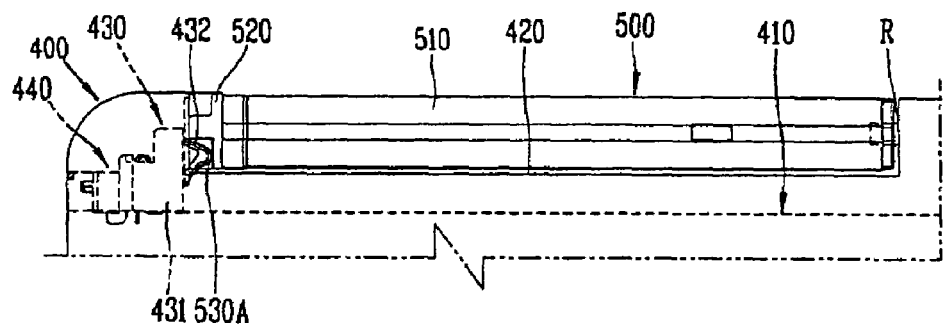
Figure 8:
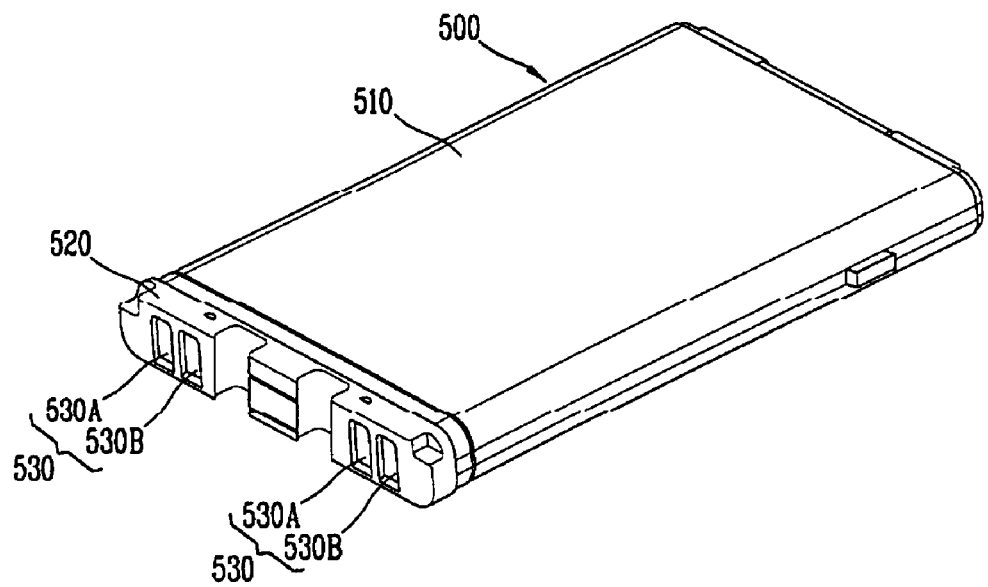
FIG. 8 is a perspective view which illustrates a battery constituting the mobile terminal.

FIG. 5 is an exploded perspective view which illustrates a mobile terminal employing a power connection structure in accordance with one embodiment of the present invention, FIG. 6 is a plan view which illustrates a power connection structure of the mobile terminal in accordance with the present invention, FIG. 7 is a side view which illustrates the power connection structure of the mobile terminal, and FIG. 8 is a perspective view which illustrates a battery constituting the mobile terminal.

As shown, the mobile terminal includes a terminal body 400 and a battery 500 detachably mounted to the terminal body 400.

Constituent elements including a main body 410 are provided inside the terminal body 400, and a battery mounting portion 420 to which the battery 500 is mounted is provided at one side of the terminal body 400. Also, a battery locking unit (R) fixing/releasing the battery 500 to/from the terminal body 400 is provided at one side of the battery mounting portion 420.

The battery mounting portion 420 of the terminal body 400 is formed at one side of the terminal body 400 as a shape having a certain area and depth corresponding to those of the battery.

The battery 500 includes a cell 510 filled with electrolyte, safety circuits (not shown) maintaining a constant and stable current when electric charge and discharge occur inside the cell 510, a protection resin 520 for protecting the protection circuits, and terminal groups 530 connected to the protection circuit to supply power and transmit information to other elements. An exterior of the cell is formed as a quadrangular shape having a certain thickness, and electrodes are formed at both end portions of one side of the cell where the safety circuits are placed. The electrodes of the cell are connected to a terminal group provided at the safety circuit. An exterior of the battery 500 is formed as a quadrangular shape having predetermined thickness and area.

There are two battery terminal groups 530. The two terminal groups 530 are disposed at one side of the battery 500 at a certain interval therebetween. The terminal group 530 of the battery 500 includes a plurality of terminals 530a and 530b. Preferably, the battery terminal group 530 includes two terminals, and the terminals 530a and 530b are disposed at a certain interval therebetween. Preferably, the battery terminal groups 530 are disposed at a surface toward a short side of the battery 500 (a width or a length of the battery which is shorter than the other).

Each of the terminals constituting the terminal groups of the battery has a quadrangular shape having certain height and width. The height of the terminal is a length in a thickness direction of the battery. Preferably, the height of the terminal corresponds to 70%~100% of the thickness of the battery.

Terminal assemblies 430 provided with a plurality of terminals 432 are mounted to the terminal body 400 at a certain interval therebetween. The number of the terminal assemblies 430 is the same as the number of the terminal groups 530 of the battery 500, and the interval between the terminal assemblies 430 is the same as that between the terminal groups 530 of the battery 500. Preferably, there are two terminal assemblies 430.

The terminal assembly 430 includes a case 431 having a predetermined shape and terminals 432 mounted to the case 431. Preferably, the number of terminals 432 of the terminal assembly 430 is two, and the terminals 432 are disposed at a certain interval therebetween.

The terminal assemblies 430 are mounted to the terminal body, being placed beside a short side of the battery mounting portion 420, and the terminals 432 of each terminal assembly 430 protrude from a side wall of the battery mounting portion 420. The terminal assemblies 430 are disposed in a row in a direction of a short side of the terminal body 400.

The terminal assemblies 430 are connected to a main board 410 constituting the terminal body 400.

A receptacle 440 used to transmit data and recharge a battery is mounted to the terminal body 400. The receptacle 440 is placed beside the battery mounting portion 420 between the terminal assemblies 430. The terminal assemblies 430 and the receptacle 440 are arranged in a row in a direction of a short side of the terminal body 400. As the terminal assemblies 430 are respectively placed at both sides of the receptacle 440, the receptacle 440 and the terminal assemblies 440 overlap with each other.

An interval between the terminal assemblies 430 is greater than a width of the interface 440 placed between the terminal assemblies 430.

The battery 500 is mounted to the battery mounting portion 420 of the terminal body 400 and fixed or released therefrom by the locking unit (R). When the battery 500 is mounted to the battery mounting portion 420, the terminals 530$a$ and 530$b$ of the battery terminal groups 530 contact with the terminals 432 of the terminal assemblies 430.

Undescribed reference numeral 600 is a battery cover.

Figure 9:
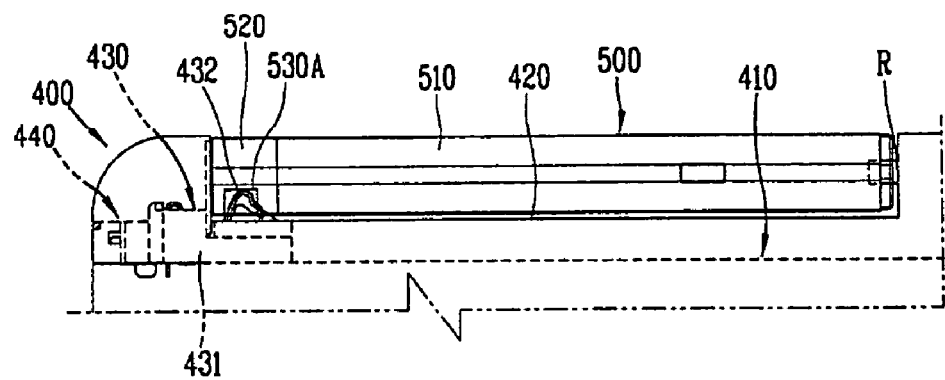
FIG. 9 is a front view which illustrates a power connection structure of the mobile terminal in accordance with another embodiment of the present invention.

FIG. 9 shows another structure in which the terminals of the battery terminal groups contact with the terminals of the terminal assemblies.

As shown, the terminal assemblies 430 are mounted to the terminal body 400, being placed below a bottom surface of the battery mounting portion 420 of the terminal body 400. Here, the terminals 432 of the terminal assemblies 430 mounted below the bottom surface of the battery mounting portion 420 protrude from the bottom surface of the battery mounting portion 420 so as to respectively contact with the terminals 530$a$ and 530$b$ of the terminal groups of the battery in mounting the battery 500.

The terminal assemblies 430 are arranged at a certain interval therebetween, and the arrangement of the terminal assemblies 430 is made in a direction of a short side of the terminal body 400.

The terminal groups 530 of the battery are placed at a surface contacting with the bottom surface of the battery mounting portion 420 so as to contact with the terminals 432 of the terminal assemblies 430 in mounting the battery 500 to the battery mounting portion 420. The battery terminal groups 530 are arranged at the battery 500 at a certain interval that is the same as that between the terminal assemblies 430. The terminal groups 530 of the battery are arranged in a row in a direction of a short side of the battery 500.

Needless to say, the receptacle 440 is mounted to the terminal body 400, being positioned between the terminal assemblies 430.

Hereinafter, an operational effect of the power connection structure of the mobile terminal in accordance with the present invention will now be described.

First, when the mobile terminal is used, power generated at the battery 500 is supplied to a main board and other elements of the terminal body 400 through terminals 530$a$ and 530$b$ of the battery terminal groups 530 and the terminals 432 of the terminal assemblies 430. When the battery is discharged, the battery 500 is detached from the terminal body 400 and recharged through a separate charger (not shown), or the battery is recharged without being detached from the terminal body.

The battery 500 is recharged or information stored in the terminal body 400 is transmitted to an external device through the receptacle 440. Here, a special connector (not shown) is used.

Also, in the present invention, the terminals 530$a$ and 530$b$ of the battery 500 are divided into a plurality of groups, a plurality of terminal assemblies 430 are formed corresponding to the terminal groups 530 of the battery 500, and a receptacle 440 is placed between the terminal assemblies 430. Namely, the terminal assemblies 430 and the receptacle 440 are arranged in a row in a direction of a short side of the terminal body 400. Thus, an area occupied by the terminal assemblies 430 and the receptacle 440 is reduced in a direction of a long side of the terminal body 400.

Also, because the terminals 530$a$, 530$b$ of the battery are divided into a plurality of terminal groups and the terminal groups 530 are disposed at regular intervals, a distance between the terminals of the terminal groups 530 and an electrode (not shown) of the cell constituting the battery 500 is relatively shortened, thereby reducing the loss. In addition, as the terminal groups 530 of the battery are respectively placed at both sides of the battery 500, a temperature sensor (not shown), an element (not shown) having an ID function or the like can be easily connected to the terminal groups 530. Also, an area occupied by the terminals 530$a$, 530$b$ constituting the terminal groups 530 of the battery is increased, which desirably improves contact efficiency between the battery terminals 530$a$ and 530$b$ and terminals 432 of terminal assemblies 430 of a terminal body.

Thus, the power connection structure of the mobile terminal in accordance with the present invention may minimize a mobile terminal by reducing a space of the terminal body 400 where the terminal assemblies and the receptacle 440 are installed and thus shortening a length of the terminal body 400. Accordingly, a user can conveniently carry the mobile terminal and competitiveness of a product can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A power connection structure of a mobile terminal, comprising:

a battery detachably mounted to a battery mounting portion of a mobile terminal body, wherein terminal groups, each including a plurality of terminals, are disposed at a predetermined interval;

a plurality of terminal assemblies including a plurality of terminals and mounted corresponding to the predetermined interval so as to respectively contact with the terminal groups of the battery; and an interface positioned between the terminal assemblies, wherein the plurality of terminal assemblies and the interface are arranged at a side of the mobile terminal body.

2. The structure of claim 1, wherein the plurality of terminal assemblies and the interface are disposed colinearly.

3. The structure of claim 1, wherein the interface is placed at the center among the terminal assemblies.

4. The structure of claim 3, wherein an interval between the terminal assemblies is greater than a width of an interface placed between the terminal assemblies.

5. The structure of claim 1, wherein a length of each terminal constituting the terminal groups of the battery in a thickness direction of the battery is 70%~100% of the battery thickness.

6. The structure of claim 1, wherein the battery includes at least two terminal groups.

7. The structure of claim 1, wherein the terminal group of the battery includes at least two terminals.

8. The structure of claim 1, wherein the terminal assembly includes at least two terminals.

9. The structure of claim 1, wherein the terminals of the terminal assembly are mounted at a bottom surface of the battery mounting portion, and the terminals of the battery terminal groups are mounted at one surface of the battery which faces the bottom surface of the battery mounting portion, such that the terminals of the terminal assembly are in contact with the terminals of the battery terminal groups.

10. The structure of claim 1, wherein the terminals of the terminal assembly and the terminals of the terminal group of the battery contact with each other in a direction of a long side of the battery.

11. The structure of claim 1, wherein the plurality of terminal groups are arranged, overlapping with one side and the other side of the interface.

* * * * *